(12) United States Patent
Iwasaki et al.

(10) Patent No.: US 6,741,924 B2
(45) Date of Patent: May 25, 2004

(54) APPARATUS AND METHOD FOR ENGINE CYLINDER INTAKE AIR QUANTITY CALCULATION

(75) Inventors: Tetsuya Iwasaki, Tokyo (JP); Yoshiaki Yoshioka, Kanagawa (JP); Hatsuo Nagaishi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 150 days.

(21) Appl. No.: 10/058,294

(22) Filed: Jan. 30, 2002

(65) Prior Publication Data

US 2002/0107633 A1 Aug. 8, 2002

(30) Foreign Application Priority Data

Feb. 5, 2001 (JP) ........................... 2001-028823

(51) Int. Cl.$^7$ .................................. G06F 19/00
(52) U.S. Cl. ................. 701/114; 701/103; 701/104; 73/118.2
(58) Field of Search ................ 701/100, 101, 701/102, 103, 104, 114; 73/118.2

(56) References Cited

U.S. PATENT DOCUMENTS

| | | | | |
|---|---|---|---|---|
| 4,911,133 A | | 3/1990 | Sogawa | ............ 123/494 |
| 5,408,962 A | * | 4/1995 | Tallio et al. | ............ 123/184.55 |
| 5,724,950 A | * | 3/1998 | Shino et al. | ............ 123/676 |
| 5,996,560 A | * | 12/1999 | Schechter | ............ 123/556 |
| 6,167,342 A | * | 12/2000 | Itoyama et al. | ............ 701/104 |
| 6,298,299 B1 | * | 10/2001 | Itoyama et al. | ............ 701/101 |
| 6,328,007 B1 | | 12/2001 | Hirasawa et al. | ............ 123/90.15 |
| 6,494,185 B2 | * | 12/2002 | Iwasaki et al. | ............ 123/478 |
| 6,564,785 B2 | * | 5/2003 | Iwasaki | ............ 123/568.21 |

FOREIGN PATENT DOCUMENTS

| JP | 61-258942 | 11/1986 |
|---|---|---|
| JP | 2001-50091 | 2/2001 |

* cited by examiner

*Primary Examiner*—John Kwon
(74) *Attorney, Agent, or Firm*—Foley & Lardner

(57) ABSTRACT

A cylinder intake air mass quantity for an engine is calculated in accordance with the cylinder intake air volume quantity, the manifold air mass quantity and a manifold volume. The cylinder intake air volume quantity is calculated in accordance with a cylinder volume at an intake valve closing timing. The manifold air mass quantity is calculated from a balance between an intake manifold inflow air mass quantity and an intake manifold outflow air mass quantity. The manifold inflow air mass quantity $Qa \cdot \Delta t$ is reset to a minimum setting value when an engine stop state with no intake air induction is detected.

14 Claims, 10 Drawing Sheets

APPARATUS AND METHOD FOR ENGINE CYLINDER INTAKE AIR QUANTITY CALCULATION

BACKGROUND OF THE INVENTION

The present invention relates to apparatus and/or method for calculating an intake air quantity for an engine, and more specifically to apparatus and/or method for calculating an intake air quantity in accordance with an output signal from an air flowmeter by calculating a balance between the quantity of air flowing into an intake manifold section of the engine and the quantity of air flowing out of the intake manifold section into an engine cylinder section.

A Japanese Patent Application Publication Kokai No. S61-258942 shows a system for calculating a cylinder intake air quantity from an output of an air flowmeter in an ordinary engine controlled with a throttle valve.

A Japanese Patent Application No. H11-223682 proposes a system for calculating a cylinder intake air quantity in an engine of a variable valve timing type.

SUMMARY OF THE INVENTION

In a method of calculating the mass of air flowing into an intake manifold section of an engine by integration of an air flow rate sensed by an air flowmeter, the calculation in an engine stop state where the intake air quantity is reduced to zero in theory tends to involve errors due to unit to unit nonuniformity, environmental nonuniformity such as changes in temperature, or nonuniformity in reference voltage of air flowmeter. In such a case, the integration of errors continues, and the calculation of the manifold air quantity could result in an incorrect value which could adversely influence the calculation of cylinder intake air quantity in an engine restart operation.

It is an object of the present invention to provide calculating system and/or method and engine system and/or engine control method which can eliminate undesired influence from errors caused in an engine stop state.

According to the present invention, a cylinder intake air quantity calculating apparatus for an engine comprises: a cylinder intake air volume quantity calculating section to calculate a cylinder intake air volume quantity in accordance with a cylinder volume at an intake valve closing timing, and an incylinder fresh air rate; a manifold air mass quantity calculating section to calculate a manifold air mass quantity by calculating a balance between an intake manifold inflow air mass quantity which is the mass of air flowing into an intake manifold section of the engine and which is determined from an air flow rate sensed on an upstream side of the intake manifold section, and an intake manifold outflow air mass quantity which is the mass of air flowing out of the intake manifold section into a cylinder section of the engine; a cylinder intake air mass quantity calculating section to calculate a cylinder intake air mass quantity in accordance with the cylinder intake air volume quantity, the manifold air mass quantity and a manifold volume; and a resetting section to reset the manifold inflow air mass quantity to a minimum setting value when an engine stop state having no intake air inducted into the engine is detected.

An engine system according to one aspect of the present invention comprises: an engine including an intake manifold section and a cylinder section into which intake air is inducted from the intake manifold section; an engine speed sensor to sense an engine speed of the engine; an air flowmeter to sense an intake air flow rate at a position on the upstream side of the intake manifold section; and a processing unit configured; to calculate a cylinder intake air volume quantity in accordance with a cylinder volume at an intake valve closing timing; to calculate a manifold air mass quantity by calculating a balance between an intake manifold inflow air mass quantity which is the mass of air flowing into the intake manifold section of the engine and which is determined from the air flow rate sensed by the air flowmeter, and an intake manifold outflow air mass quantity which is the mass of air flowing out of the intake manifold section into the cylinder section of the engine; and to calculate a cylinder intake air mass quantity in accordance with the cylinder intake air volume quantity, the manifold air mass quantity and a manifold volume. The processing unit may be further configured to examine whether the engine speed sensed by the engine speed sensor is within a stop range indicative of an engine stoppage; to examine whether the air flow rate sensed by the air flowmeter is within a predetermined flow rate range; and to reset the manifold inflow air mass quantity to a minimum setting value when the engine speed is within the stop range, and at the same time the air flow rate sensed by the air flowmeter is within the flow rate range. Alternatively, the processing unit may be further configured to examine whether the engine speed sensed by the engine speed sensor is within a stop range indicative of an engine stoppage; to examine whether a variation of the air flow rate sensed by the air flowmeter is equal to or smaller than a predetermined value; and to reset the manifold inflow air mass quantity to a minimum setting value when the engine speed is within the stop range, and at the same time the variation of the air flow rate sensed by the air flowmeter is equal to or smaller than the predetermined value.

According to the present invention, a cylinder intake air quantity calculating process for an engine, comprises: calculating a cylinder intake air volume quantity in accordance with a cylinder volume at an intake valve closing timing, and an incylinder fresh air rate; calculating a manifold air mass quantity by calculating a balance between an intake manifold inflow air mass quantity which is the mass of air flowing into an intake manifold section of the engine and which is determined from an air flow rate sensed on an upstream side of a manifold section, and an intake manifold outflow air mass quantity which is the mass of air flowing out of the intake manifold section into a cylinder section of the engine; calculating a cylinder intake air mass quantity in accordance with the cylinder intake air volume quantity, the manifold air mass quantity and a manifold volume; and resetting the manifold inflow air mass quantity to a minimum setting value when an engine stop state in which induction of air into the engine is stopped, is detected.

According to still another aspect of the present invention, a cylinder intake air quantity calculating apparatus for an engine, comprises: means for calculating a cylinder intake air volume quantity in accordance with a cylinder volume at an intake valve closing timing; means for calculating a manifold air mass quantity by determining a balance between an intake manifold inflow air mass quantity which is the mass of air flowing into an intake manifold section of the engine, and an intake manifold outflow air mass quantity which is the mass of air flowing out of the intake manifold section into a cylinder section of the engine; means for calculating a cylinder intake air mass quantity in accordance with the cylinder intake air volume quantity, the manifold air mass quantity and a manifold volume; and means for resetting the manifold inflow air mass quantity to a minimum setting value when an engine stop state is detected.

The other objects and features of this invention will become understood from the following description with reference to the accompanying drawings.

DETAILED DESCRIPTION OF THE INVENTION

Figure 1:
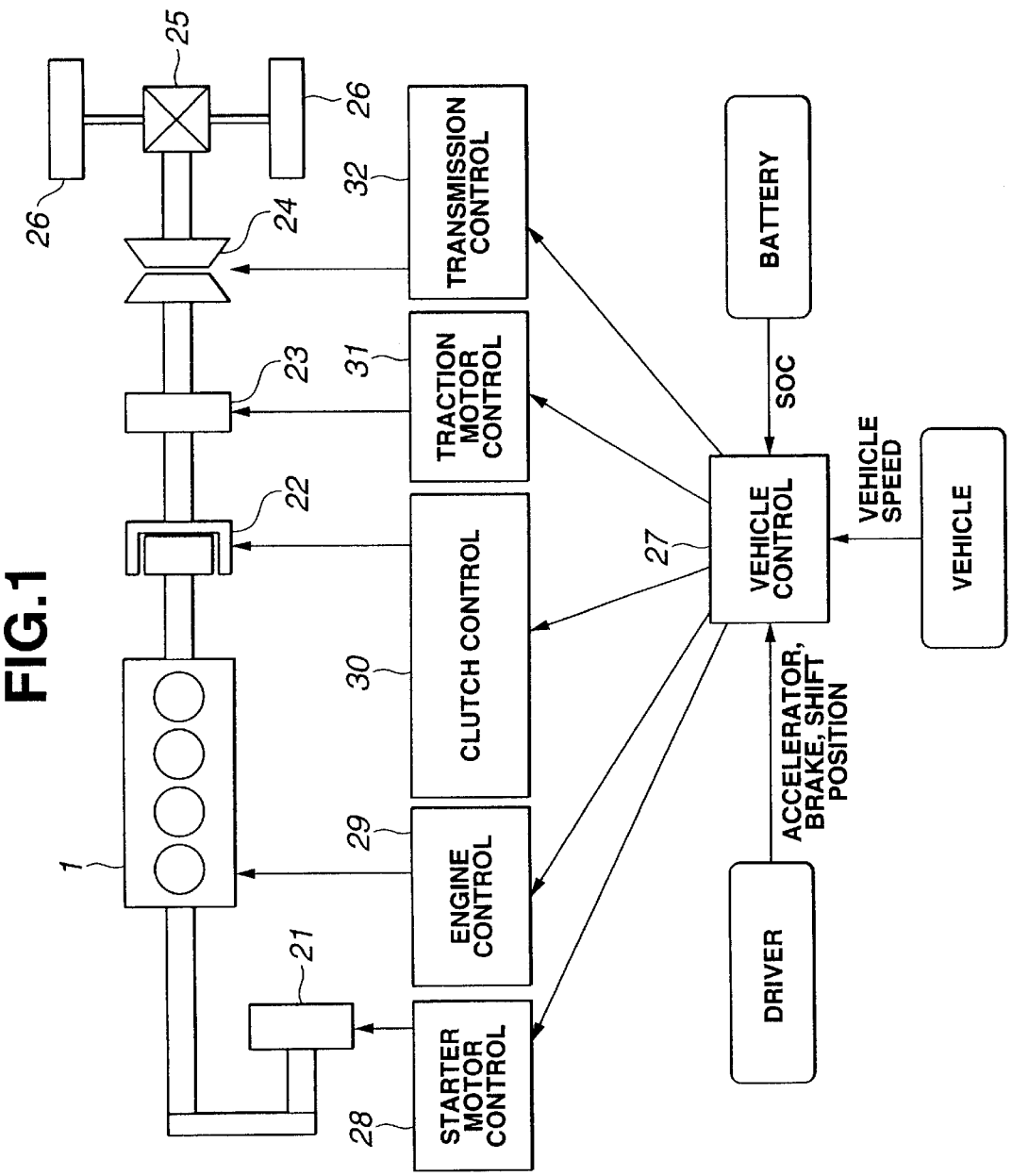
FIG. 1 is a schematic view showing a vehicle according to one embodiment of the present invention. An engine of the vehicle is a variable valve timing type provided with an idle stop function.

FIG. 1 shows a power train system of a hybrid vehicle equipped with a variable valve characteristic type engine according to one embodiment of the present invention.

A starter motor 21 is a motor to start an engine 1. The output shaft of engine 1 is connected with a traction motor 23 through a clutch 22 such as a powder clutch for driving connection for power transmission and disconnection therebetween. The output shaft of traction motor 23 is connected through a transmission 24 and a differential gear unit 25, with drive wheels 26 of the vehicle.

A vehicle control circuit 27 collects various input information. Vehicle control circuit 27 receives signals representing a driver's accelerator input, a driver's brake input and a transmission shift position selected by the driver, a vehicle speed of the vehicle, and a state of charge of a battery. Vehicle control circuit 27 controls various components of the vehicle through starter motor control circuit 28, engine control circuit 29, clutch control circuit 30, traction motor control circuit 31 and transmission control circuit 32.

The vehicle of this example has an idle stop function to stop engine 1 at a predetermining idling condition to improve the fuel economy and exhaust emission control.

Figure 2:
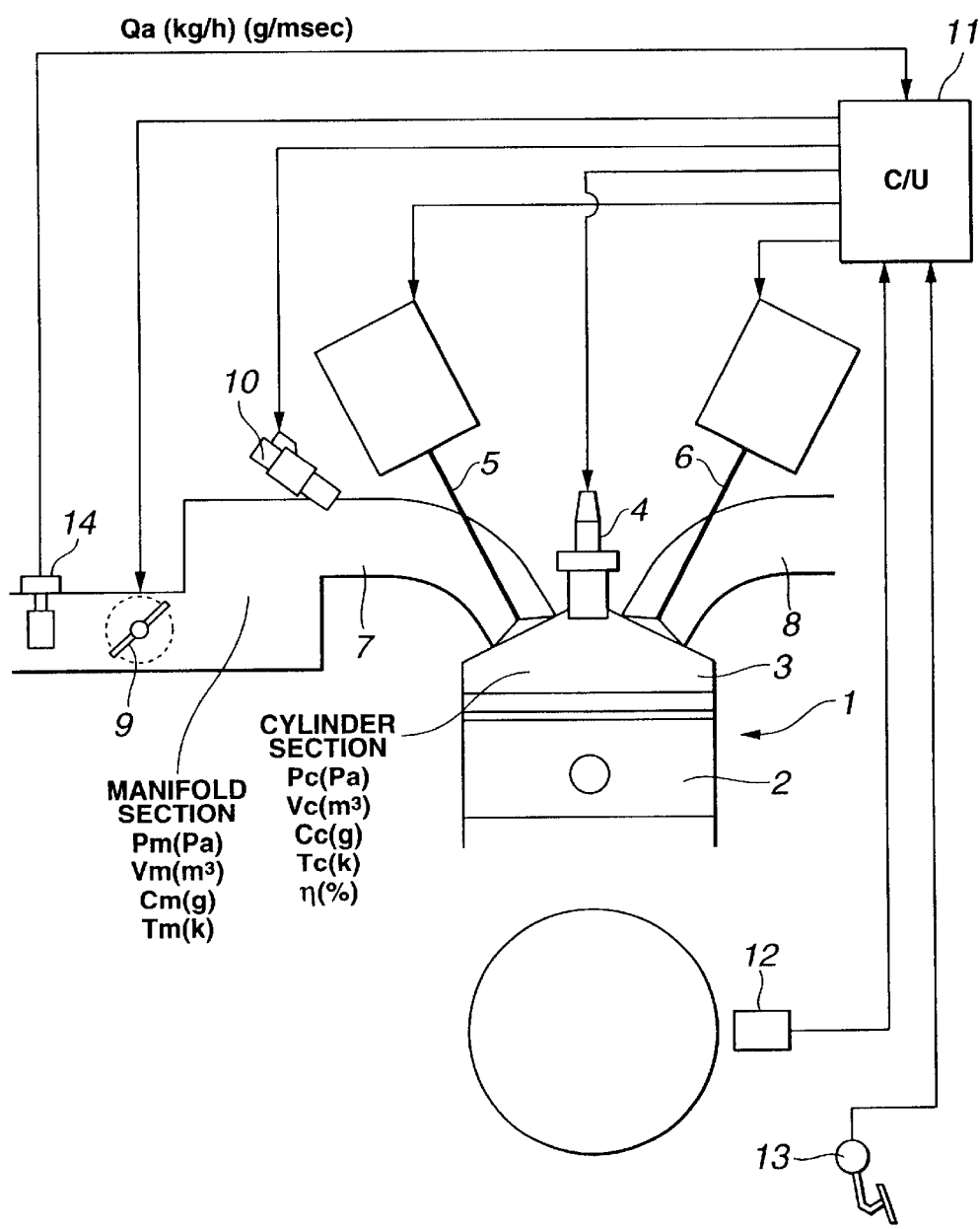
FIG. 2 is a schematic view showing an engine system of the vehicle shown in FIG. 1.

FIG. 2 schematically shows variable valve characteristic type engine 1 employed in this example. In FIG. 2, only one cylinder is shown for simplification and facilitating explanation.

A piston 2 (for each cylinder) defines a combustion chamber 3. Around a spark plug 4, there are provided intake valve 5 and exhaust valve 6 of electromagnetic drive type. FIG. 2 further shows intake passage 7 and exhaust passage 8.

Figure 3:
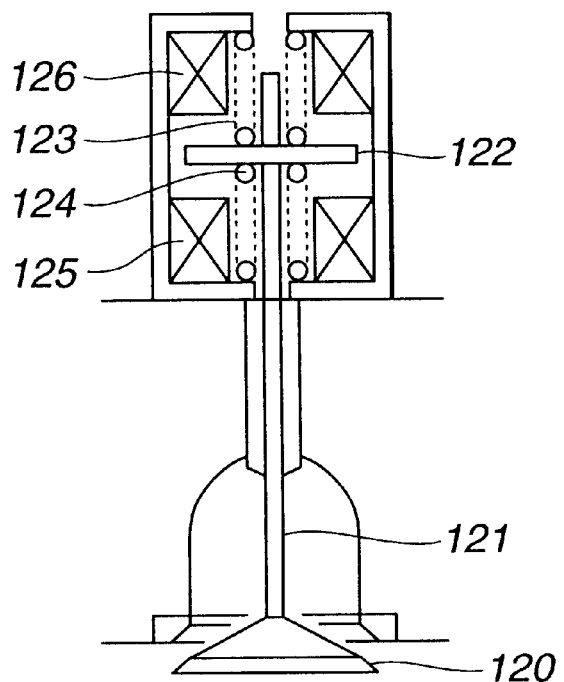
FIG. 3 is a schematic view showing a variable valve timing actuator of the engine shown in FIG. 2.

FIG. 3 shows an electromagnetic (or solenoid) valve actuator (variable valve drive apparatus) employed in this embodiment for each of intake and exhaust valves 5 and 6. This actuator serves as a variable valve timing actuator. A valve element 120 has a valve stem 121. A plate-shaped movable member 122 is attached to valve stem 121. Movable member 122 is normally held at a neutral position by springs 123 and 124. An opening solenoid (electromagnetic coil) 125 is disposed below movable member 122, and a closing solenoid (electromagnetic coil) 126 is above movable member 122.

The valve is moved from a closed state to an open state by deenergizing upper closing solenoid 126 and then attracting movable member 122 downward by energizing lower opening solenoid 125. Thus, valve element 120 is lifted from a valve seat and the valve is opened. The valve is moved from the open state to the closed state by deenergizing lower opening solenoid 125, and then attracting movable member 122 upward by energizing upper closing solenoid 126. Thus, valve element 120 is seated on the valve seat and the valve is closed.

Instead of the electromagnetic type valve actuator employed in this example, it is optional to employ a hydraulic variable valve actuator.

Reverting to FIG. 2, there is provided, in intake passage 7 at a position on the upstream side of a manifold section, a throttle valve 15 whose opening degree is controlled electronically. An electromagnetic type fuel injector 10 is provided in the intake port for each cylinder.

A processing unit 11 of this example is a control unit or controller of an engine control system for controlling intake valves 5, exhaust valves 6, electronically controlled throttle valve 9, fuel injectors 10, and spark plugs 4. In this example, control unit 11 can serve as a main component of engine control circuit 29.

Sensors of the engine control system of this example are: crank angle sensor (engine speed sensor) 12 for producing a crank angle signal in synchronism with engine rotation to provide information on crank angular position and engine speed Ne; accelerator pedal sensor 13 for sensing an accelerator opening degree (accelerator pedal depression degree) APO; and air flowmeter (or air flow sensor) 14 disposed on the upstream side of throttle valve 9, for measuring an intake air quantity (mass flow rate) Qa. Air flowmeter of this example is a hot wire type flowmeter. Signals from these sensors are inputted to control unit 11.

The engine control system of this example controls the opening and closing timings of intake and exhaust valves 5 and 6 in order to reduce the pumping loss and improve the fuel efficiency. Specifically, by setting the opening timing IVO of intake valve 5 (for each cylinder, that is) at a point near top dead center, and varying the closing timing IVC of intake valve 5, this control system can control the actual intake air quantity to achieve a desired air quantity to meet a required torque based on the accelerator opening degree APO and engine speed Ne, substantially without the aid of throttle valve (in a non-throttle operation mode). In this case, throttle valve 9 is set at an opening degree to provide a very low negative pressure (of about −50 mmHg) in the manifold section at a predetermined operating state (other than the heavy load operation).

The opening timing EVO and closing timing EVC of exhaust valve 6 (for each cylinder) are controlled so as to maximize the thermal efficiency. In operating states (such as idling state or a light load operating state in a cold engine state) where the control of the intake air quantity by the control of intake valve closing timing IVC tends to degrade the combustion state, the control system can control the intake air quantity by controlling the opening degree of throttle valve 9 by fixing the intake valve closing timing IVC near bottom dead center.

Fuel injection timing and quantity for fuel injector 10 are controlled in accordance with engine operating conditions. The engine control system of this example controls the fuel injection quantity basically so as to achieve a desired air-fuel ratio with respect to a cylinder intake air quantity (cylinder air mass quantity) Cc calculated from intake air quantity (mass flow rate) Qa measured by air flowmeter 14 as explained below.

Ignition timing for each spark plug 4 is controlled in accordance with engine operating conditions so as to achieve MBT (optimum ignition timing for best torque) or to knock limit.

FIGS. 4–9 show a procedure for calculating cylinder intake air quantity Cc (the mass of air inducted to an engine cylinder section) used for engine control such as fuel injection quantity control. In this example, intake air quantity (mass flow rate) Qa (Kg/h) measured by air flowmeter 14 is multiplied by 1/3600 and treated as (g/msec). In an intake manifold section, as shown in FIG. 2, a pressure is Pm (Pa), a volume is Vm (m$^3$, constant), an air mass quantity (the mass of air) is Cm (g), and a temperature is Tm (K). In an engine cylinder section, a pressure is Pc (Pa), a volume is Vc (m$^3$), an air mass quantity (the mass of air) is Cc (g), and a temperature is Tc (K). An incylinder fresh air rate is η (%). In this example, it is assumed that Pm=Pc, and Tm=Tc. Thus, the pressure and temperature remain unchanged between the intake manifold section and the engine cylinder section.

Figure 4:
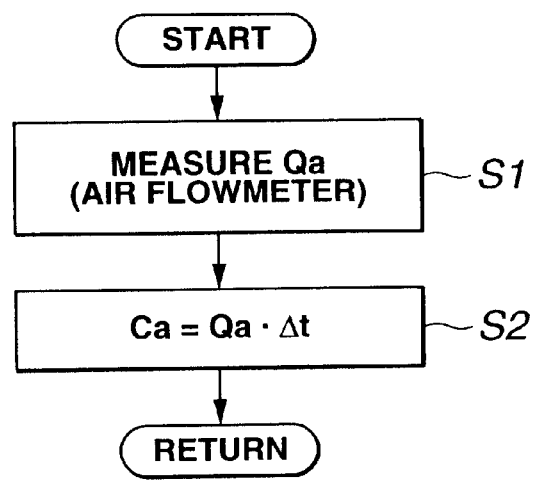
FIG. 4 is a flowchart showing an manifold section inflow air quantity calculating routine for an engine control unit shown in FIG. 2, to calculate a manifold section inflow air quantity.

FIG. 4 shows a routine for calculating an intake manifold inflow air quantity, performed at regular time intervals of a predetermined time Δt (1 msec, for example).

Step S1 is a step to read the intake air quantity Qa (mass flow rate; g/msec) calculated from the output of air flowmeter 14. Step S2 is to calculate a manifold (section) inflow air quantity Ca (the mass (g)) of air flowing into the intake manifold section during each predetermined time period Δt by integration of intake air quantity Qa. In this example;

$$Ca = Qa \cdot \Delta t$$

Figure 5:
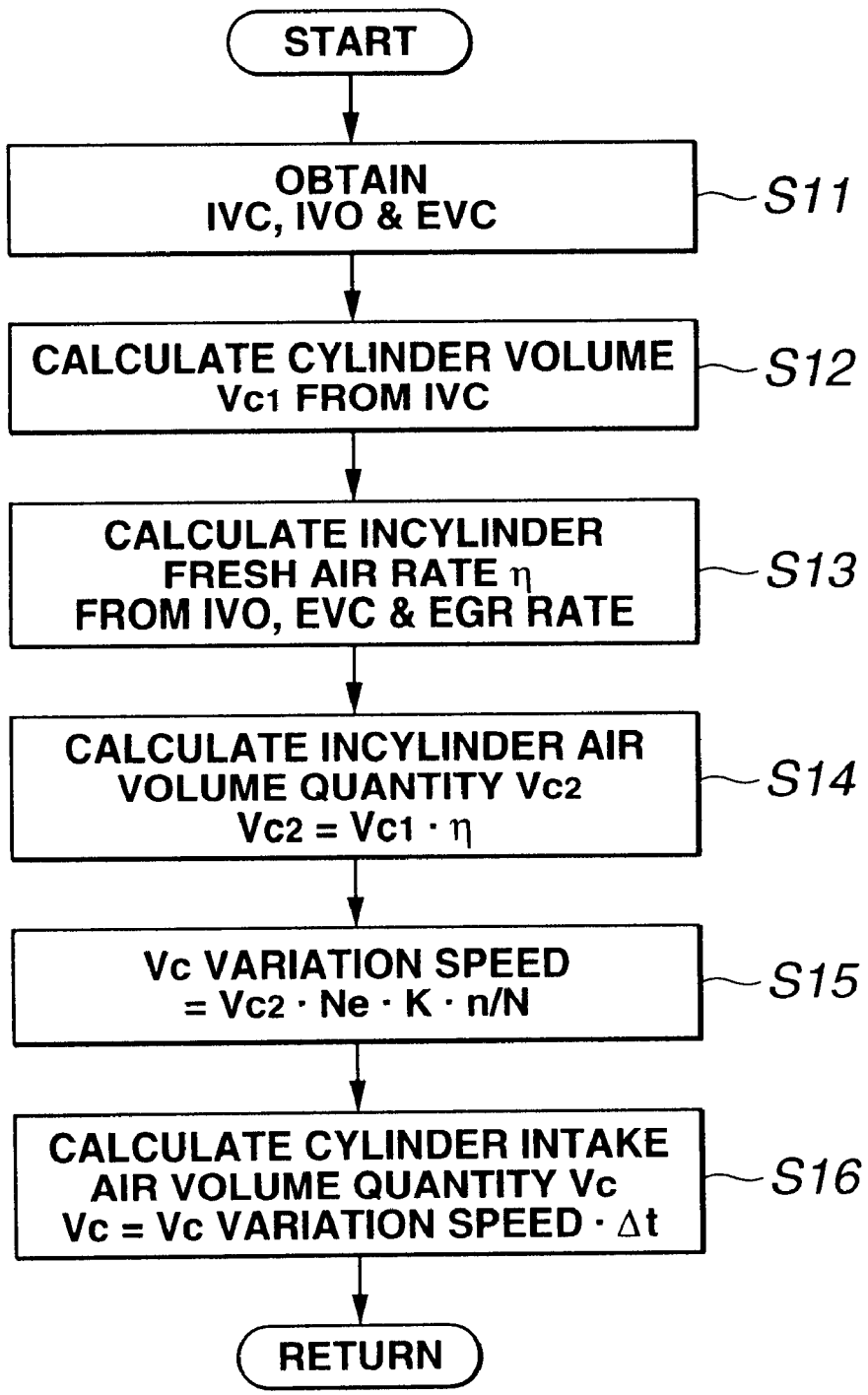
FIG. 5 is a flowchart showing a cylinder intake air volume quantity calculating routine for the engine control unit shown in FIG. 2.

FIG. 5 shows a routine for calculating a cylinder intake air volume quantity, performed at regular time intervals of the predetermined time Δt. The routine of FIG. 5 corresponds to a cylinder intake air volume quantity calculating section.

Step S11 detects closing timing IVC of intake valve 5, opening timing IVO of intake valve 5 and closing timing EVC of exhaust valve 6. It is possible to employ lift sensors for directly sensing the valve opening or closing timing for intake and exhaust valves 5 and 6. However, it is optional to simplify the system configuration by employing target valve timings (command values) used in control unit 11 for the engine control.

Step S12 uses the intake valve closing timing IVC and calculates a (IVT) cylinder volume Vc1 (m$^3$) at intake valve closing timing IVC, from intake valve closing timing IVC.

Step S13 calculates the incylinder fresh air rate η (%) from intake valve opening timing IVO and exhaust valve closing timing EVC, and by further using EGR rate according to the need. That is, a valve overlap quantity is determined by intake valve opening timing IVO and exhaust valve closing timing EVC, and the residual gas quantity (i.e., the internal EGR quantity) increases as the overlap quantity increases. Therefore, the control system can calculate the incylinder fresh air rate (or percentage) η in accordance with the overlap quantity. In the engine of variable valve timing type, the internal EGR quantity is freely controlled by control of the valve overlap quantity, so that there is provided no EGR apparatus (for external EGR) in general. If an EGR apparatus is provided for external EGR, the control system uses the EGR rate determined by the EGR apparatus for correction of the incylinder fresh air rate, and thereby determines a final fresh air rate.

Step S14 calculates an incylinder air volume quantity Vc2 by multiplying the (IVC) cylinder volume Vc1 by incylinder fresh air rate η. That is;

$$Vc2\ (m^3) = Vc1 \cdot \eta$$

Step S15 calculates a Vc variation speed (volume flow rate; m$^3$/msec) by multiplying the incylinder air volume quantity Vc2 (m$^3$) by engine speed Ne (rpm).

$$Vc \text{ variation speed} = Vc2 \cdot Ne \cdot K$$

In this equation, K is a constant for adjusting units, and K=(1/30)×(1/1000) where 1/30 is for conversion from Ne (rpm) to Ne (180 deg/sec), and 1/1000 is for conversion from Vc variation speed (m$^3$/sec) to Vc variation speed (m$^3$/msec).

In the case where part of cylinders are cut off from operation, the following equation is used;

$$Vc \text{ variation speed} = Vc2 \cdot Ne \cdot K \cdot n/N$$

In this equation, n/N is an operating ratio, N is the number of the cylinders of the engine, and n is the number of cylinders held in operation. When, for example, one cylinder is cut off from operation in a four cylinder engine, n/N is equal to 3/4. When the operation of a specified cylinder is cut off, the fuel is cut off in the state in which the intake and exhaust valves of that cylinder are held in the fully closed state.

Step S16 calculates a cylinder intake air volume quantity Vc which is the volume of air inducted into the cylinder section per predetermined time length Δt, by integration of the Vc variation speed (volume flow rate; m$^3$/msec) (or the rate of change of Vc). In this example, cylinder intake air volume quantity Vc (m$^3$)=Vc variation speed·Δt.

Figure 6:
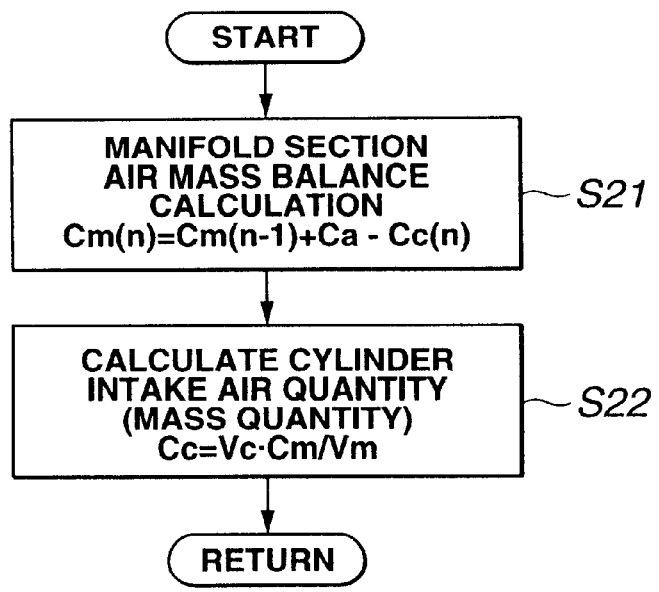
FIG. 6 is a flowchart showing a continuous calculation routine for the engine control unit shown in FIG. 2, to calculate a balance between an inflow air quantity and an outflow air quantity in the manifold section.
Figure 7:
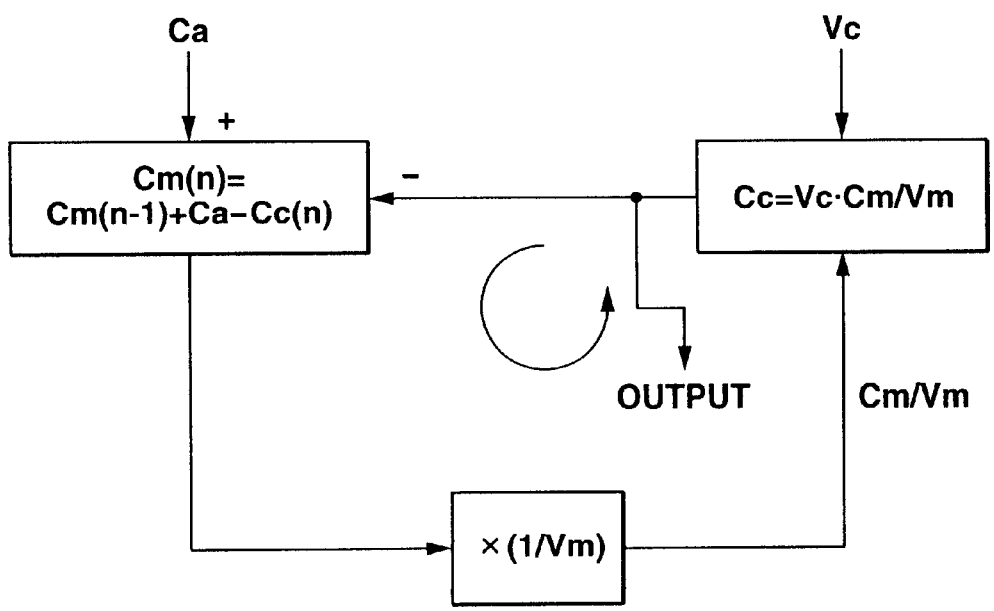
FIG. 7 is a block diagram illustrating the continuous calculation of FIG. 6.

FIG. 6 shows a routine for continuous (or iterative) calculation (intake manifold section intake air balance calculation and cylinder section air mass quantity calculation), performed repeatedly at regular time intervals of the predetermined time Δt. FIG. 7 shows this continuous calculation in the form of a block diagram.

Step S21 is a step for manifold section intake air balance calculation (to determine a manifold section air mass quantity Cm). Step S21 calculates the manifold (section) air mass quantity Cm(n) (g) from a previous manifold air mass quantity Cm(n−1) which is a previous value of the manifold air mass quantity Cm, by addition of the manifold inflow air mass quantity Ca (=Qa·Δt) determined in the routine of FIG. 4 and subtraction of the manifold outflow air mass quantity Cc(n) which is the cylinder intake air quantity (mass quantity) of air flowing out of the manifold section into the cylinder section. That is;

$$Cm(n)=Cm(n-1)+Ca-Cc(n)$$

As Cc(n) in this equation, step S21 uses a value of Cc calculated at next step S22 in a previous execution of this routine.

Step S22 is a step for calculation of the cylinder intake air quantity (cylinder section air mass quantity Cc). Step S22 calculates the cylinder intake air quantity Cc (g) per predetermined time length Δt, from the cylinder intake air quantity (cylinder section air volume quantity) Vc per Δt determined by the routine of FIG. 5, by multiplication by manifold section air mass quantity Cm and division by manifold (section) volume Vm (constant value). That is;

$$Cc=Vc \cdot Cm/Vm \quad (1)$$

This equation (1) is obtained as follows. Rearrangement of an equation of state of gas $P \cdot V = C \cdot R \cdot T$ provides $C = P \cdot V/(R \cdot T)$. Therefore, as to the cylinder section;

$$Cc=Pc \cdot Vc/(R \cdot Tc) \quad (2)$$

Assuming Pc=Pm and Tc=Tm, $$Cc=Pm \cdot Vc/(R \cdot Tm) \quad (3)$$

On the other hand, rearrangement of the equation of state of gas $P \cdot V = C \cdot R \cdot T$ provides $P/(R \cdot T) = C/V$. Therefore, as to the manifold section;

$$Pm/(R \cdot Tm)=Cm/Vm \quad (4)$$

Substitution of equation (4) into equation (3) yields;

$$Cc=Vc \cdot [Pm/(R \cdot Tm)]=Vc \cdot [Cm/Vm]$$

Thus, the equation (1) is obtained.

In this way, the control system according to this embodiment can determine the cylinder section air mass quantity Cc (g) which is the cylinder intake air quantity, by performing steps S21 and S22 repeatedly as shown by a circular arrow indicating continuous calculation in FIG. 7, and output the thus-determined cylinder section air mass quantity Cc (g) as an output signal. The order of steps S21 and S22 can be reversed. In this case, the control system performs step S22 first, and then performs step S21 after step S22.

Step S21 of FIG. 6 corresponds to a manifold air mass quantity calculating section. Step S22 corresponds to a cylinder intake air mass quantity calculating section.

Figure 8:
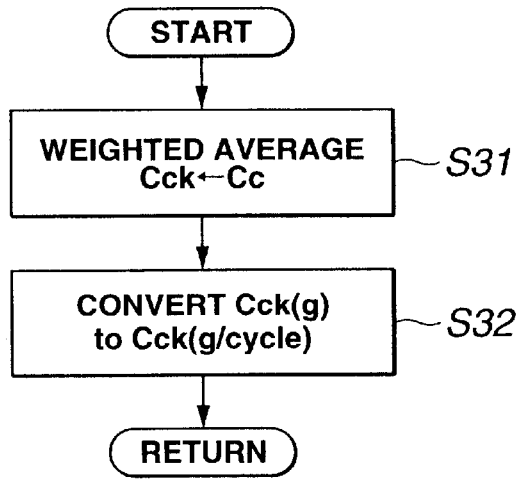
FIG. 8 is a flowchart showing an aftertreatment routine performed by the engine control unit shown in FIG. 2.

FIG. 8 shows an aftertreatment routine. Step S31 performs a process of weighted average on the cylinder section air mass quantity Cc (g), as expressed by the following equation, and thereby determines Cck (g).

$$Cck=Cck \times (1-M)+Cc \times M$$

where M is a weight constant factor, and 0<M<1.

Step S32 converts the thus-determined cylinder section air mass quantity Cck (g) to a per-cycle cylinder section air mass quantity Cck (g/cycle) by using engine speed Ne (rpm) to adapt the air mass quantity Cck to the cycle period.

$$Cck \ (g/cycle)=Cck/(120/Ne)$$

The per-cycle cylinder section air mass quantity Cck (g/cycle) is a cylinder air mass quantity per cycle (2 revolutions=720 deg).

Figure 9:
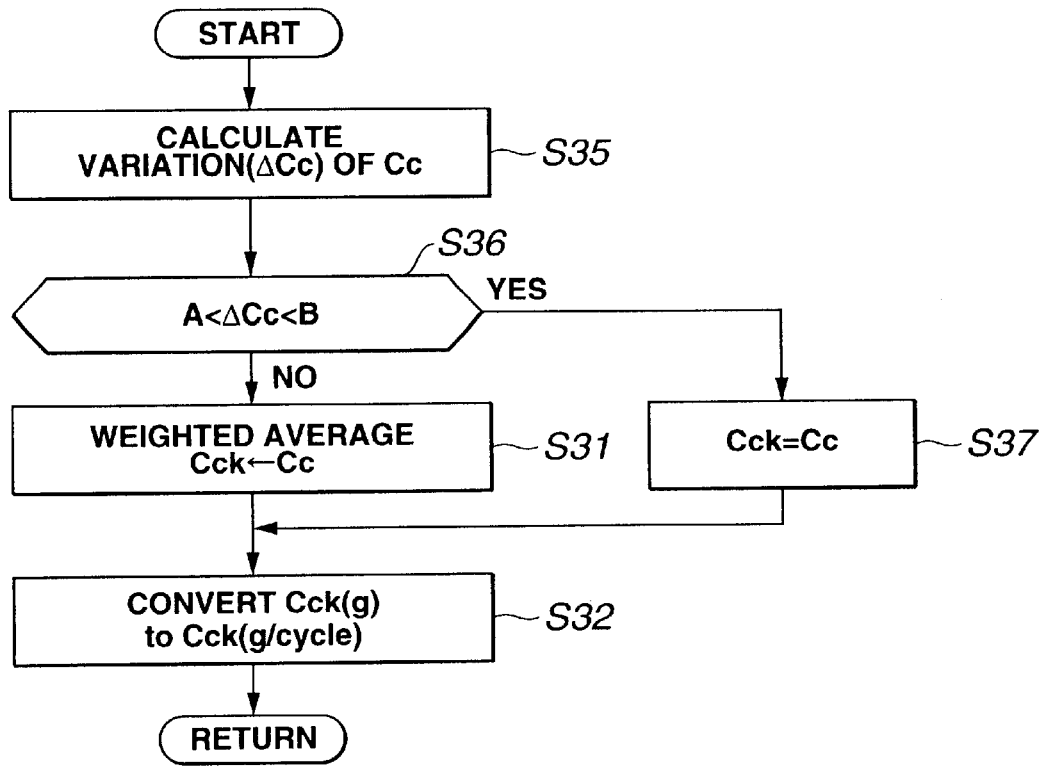
FIG. 9 is a flowchart showing an aftertreatment routine in an another example of the embodiment.

FIG. 9 shows a variation of aftertreatment routine. It is possible to achieve the control accuracy and control response simultaneously by performing this weight averaging operation only when the pulsation of the intake air flow is strong as in a situation of wide open throttle or full throttle where the throttle valve is wide or fully open. Therefore, in the routine of FIG. 9, step S35 calculates a variation quantity ΔCc of the cylinder section air mass quantity Cc(g), and next step S36 checks whether the variation quantity ΔCc is within a predetermined range (between first and second values A and B). If the variation quantity ΔCc is greater than a first value A and smaller than a second value B, there is no need for the weight averaging operation, and step S37 sets Cck (g) equal to Cc (g) (Cck=Cc). After step S37, step S32 converts the cylinder section air mass quantity Cck (g) to the per-cycle cylinder section air mass quantity Cck (g/cycle) as in step S32 of FIG. 8. If the variation quantity ΔCc is outside the predetermined region, step S31 performs the weight averaging operation as in step S31 of FIG. 8, and the routine proceeds to step S32 as in FIG. 8.

Figure 10:
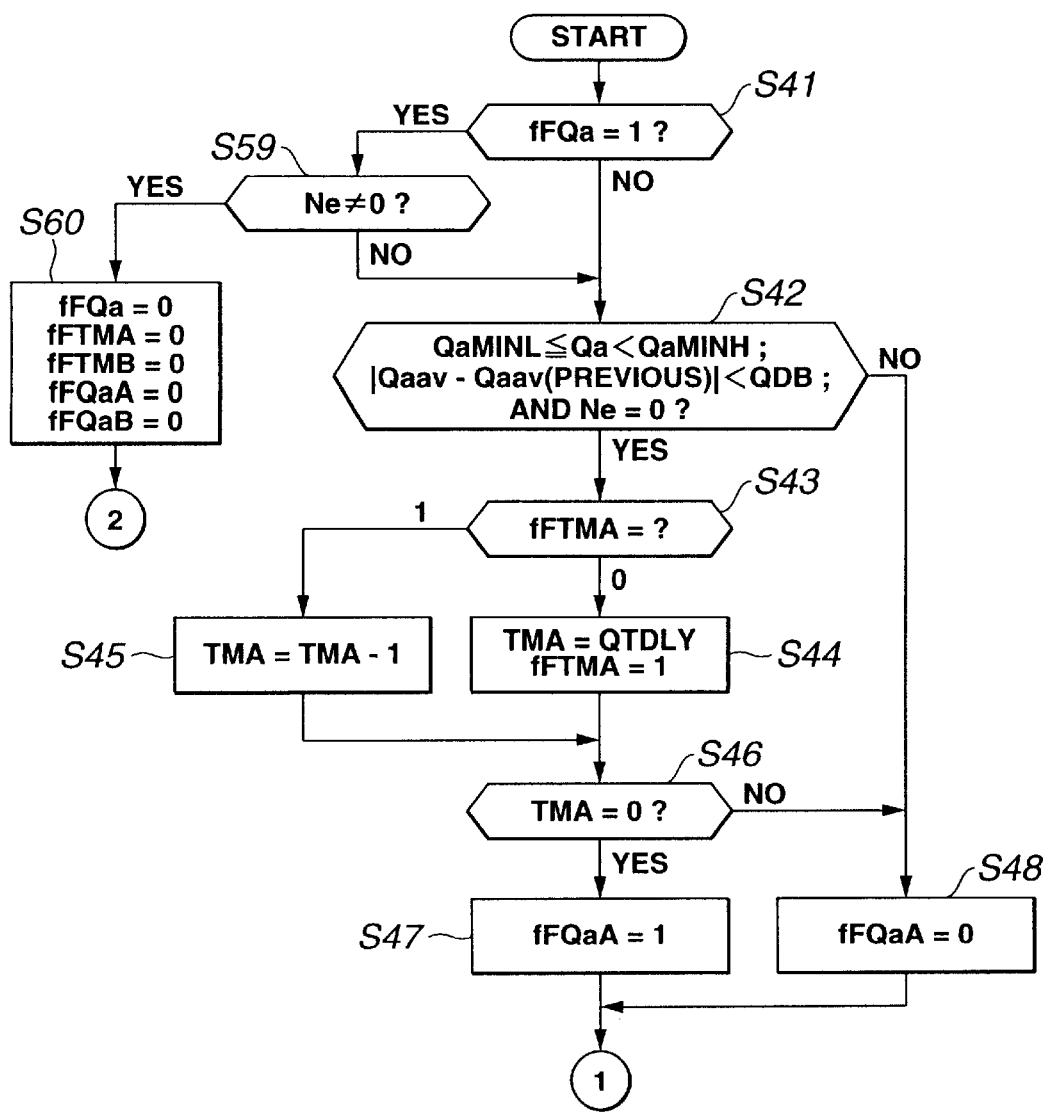
FIG. 10 is a flowchart showing a first part of a control routine performed by the engine control unit of FIG. 2 in an engine stop state.
Figure 11:
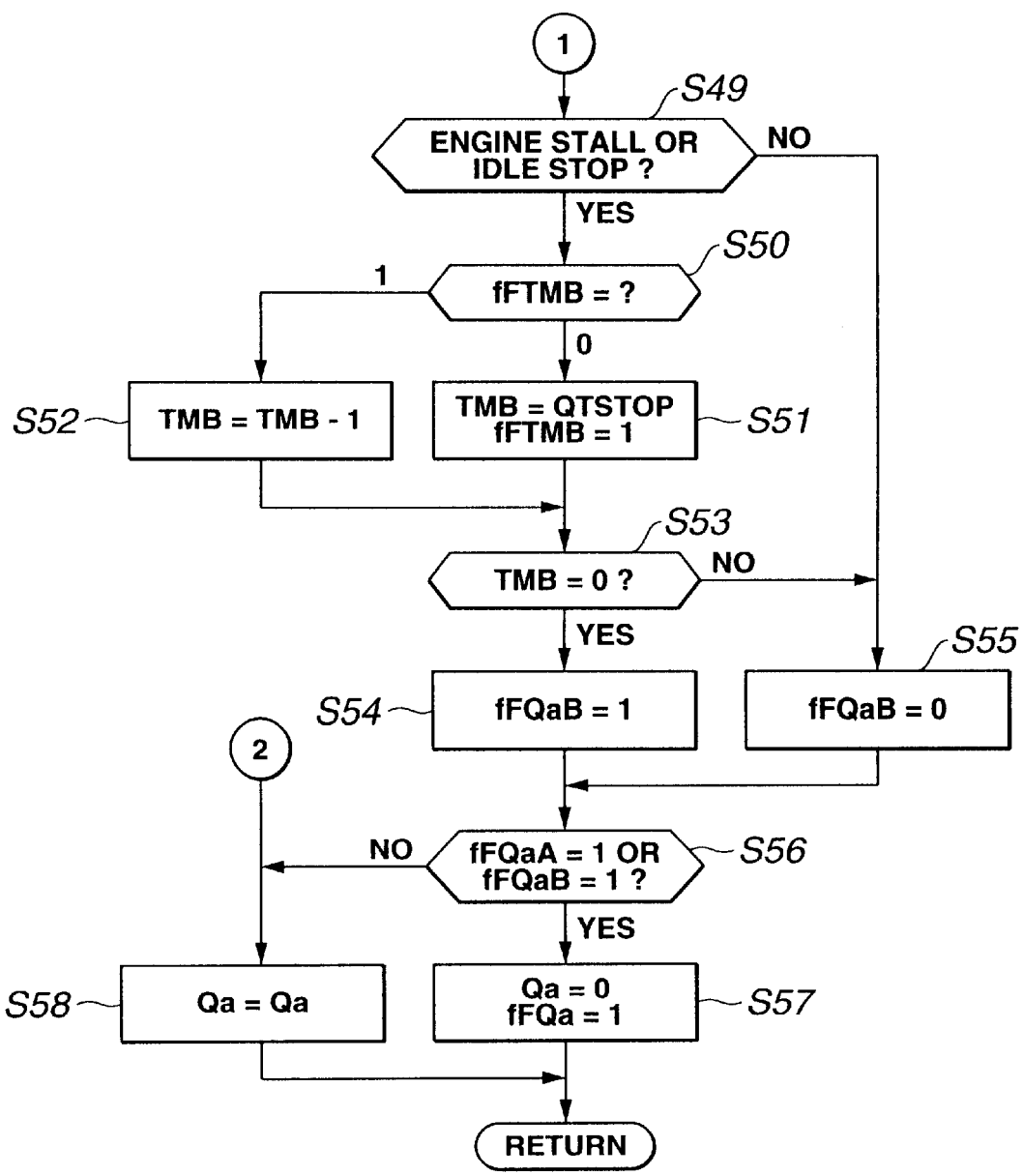
FIG. 11 is a flowchart showing a second part of the control routine performed by the engine control unit of FIG. 2 in the engine stop state.

FIGS. 10 and 11 show a control routine for preventing undesired influence on the calculation of the cylinder intake air quantity, from measurement errors of air flowmeter 14 in an engine stop state in which no air is inducted into the engine.

Step S41 is a step for checking the value of an intake stop flag fFQa. Intake stop flag fFQa is set to one when an engine stop state is detected, and reset to zero otherwise. The engine stop state is a state in which air is not inducted into the engine.

If fFQa=0, then the control system proceeds from step S41 to step S42 to examine whether the following three conditions are all satisfied.

First, the intake air quantity Qa sensed by air flowmeter 14 is within a predetermined range near zero. That is;

$$QaMINL \leq Qa < QaMINH$$

Second, a variation quantity per unit time (50 msec, for example) of the intake air quantity is equal to or lower than a predetermined value. In this example, the control system uses, as the intake air quantity, a smoothed or averaged value of the intake air quantity Qa. This example uses an intake air quantity Qaav obtained by subjecting the intake air quantity Qa to a smoothing operation by weighted average operation or an operation of setting hysteresis in increasing and decreasing directions, to prevent misjudgment due to noises.

$$|Qaav-Qaav(50 \text{ msec before})| < QDB$$

Third, engine speed Ne determined from the signal from crank angle sensor 12 is equal to zero.

In an engine speed sensing mode of sensing engine speed Ne by receiving POS signals produced by crank angle sensor 12 every unit crank angle (1°, for example) and counting the number of POS signals received during a predetermined time period, the control system judges that the third condition of engine speed Ne being equal to zero is satisfied when the number of received POS signals during the predetermined time period is equal to zero, or equal to or smaller than a predetermined value. In the case of another mode of sensing engine speed Ne by using the reciprocal of a recurrence period of REF signals produced periodically at a reference crank angle position for each cylinder by crank angle sensor 12, the engine speed measurement tends to become inaccurate more or less in a very low speed region near zero. Therefore, an estimated engine speed is determined, after an output of REF signal, on the assumption that a new REF signal is outputted every time period which is sufficiently shorter than the recurrence period of REF signals. Then, the control system compares the thus-determined estimated engine speed and the previous engine speed sensed at the previous occurrence of REF signal, and selects a smaller value between the estimated speed and the previous speed, as a current sensed engine speed. The control system judges that the third condition of Ne=0 is satisfied when the thus-determined engine speed Ne becomes equal to or lower than a predetermined value.

If all the above-mentioned three conditions are satisfied, then control unit 11 judges that the engine is in the engine stop state where air is not inducted into the engine. It is possible to reset the intake air quantity Qa to zero immediately at this stage. This arrangement can simplify the control system. To further simplify the system, it is optional to reset intake air quantity Qa to zero if any one or more of the above-mentioned three conditions is satisfied. In this example, the resetting operation is performed when the detection of the engine stop state is further confirmed at step S43 and subsequent steps.

If all the three conditions are satisfied, the control system proceeds from step S42 to step S43, and checks a timer operation flag fFTMA which is set to one when a predetermined time has elapsed. When the predetermined time has not elapsed yet, and hence fFTMA=0, then the control system proceeds from step S43 to step S44. At step S44, the control system sets a timer TMA to an initial value QTDLY, and sets timer operation flag fFTMA to one. With timer operation flag fFTMA set to one, the control system proceeds, in the next execution cycle, from step S43 to step S45, and decrements the timer TMA at step S45 (TMA=TMA−1). When the predetermined time has elapsed and hence it is judged that the value of timer TMA is equal to zero at step S46, the control system proceeds to step S47, and sets a first intake stop flag fFQaA to one in accord with the judgment that the engine stop state first detected by the three conditions is confirmed. Step S48 is reached when at least one of the three conditions is not satisfied (in the examination of step S42), and when timer TMA is not equal to zero (in the examination of step S46). First intake stop flag fFQaA is reset to zero at step S48.

At step S49 following step S47 or S48, the control system further checks the existence of the engine stop state in addition to the check at step S42. At step S49, the control system checks whether an unpredicted engine stall (unintended stoppage of the engine) has occurred or whether an idle stop command has been produced to command stoppage of the engine at idling. By this check, the control system can perform the resetting operation to zero even if the requirement of step S42 (of the above-mentioned three conditions) is not met because of some problem such as failure in the air flowmeter. In this example, the control system affirms the occurrence of an engine stall when, in the state in which an engine stop command is not produced, a time equal to or longer than a predetermined length (1.5 sec, for example) has elapsed with no production of a next REF signal from a most recent generation of REF signal judgment of idle stop command is made when a host computer delivers an engine stop command to ECM (engine control unit), and at the same time a time equal to or longer than a predetermined length (1.5 sec, for example) has elapsed with no production of a next REF signal from a most recent generation of REF signal. Consequently, the condition for both cases is that a period receiving no REF signal lasts for a time duration equal to or longer than a predetermined length (1.5 sec, for example).

If this condition is met, the control system proceeds from step S49 to step S50, and checks the value of a timer operation flag fFTMB which is set to one after the elapse of a predetermined time. When the predetermined time has not yet elapsed, and hence fFTMB=0, then the control system proceeds to step S51. At step S51, the control system sets a timer TMB to an initial value QTSTOP, and sets the timer operation flag fFTMB to one. With this setting of timer operation flag fFTMB to one, the control system proceeds, in the next execution cycle, from step S50 to step S52, and decrements timer TMB before reaching step S53. When the predetermined time has elapsed and hence it is judged that the value of timer TMB is equal to zero at step S53, the control system proceeds to step S54, and sets a second intake stop flag fFQaB to one in accord with the judgment that the engine stop state first confirmed at step S49 is confirmed. When the answer of step S49 is negative, or when the value of timer TMB is still greater than zero, the control system proceeds from step S49 or S53, to step S55, and resets second intake stop flag fFQaB to zero.

After the flag handling operation at step S54 or S56, the control system proceeds to step S56, and checks the first intake stop flag fFQaA based on the above-mentioned three conditions, and the second intake stop flag FFQaB based on the engine stall/idle stop condition. If either of fFQaA and fFQaB is equal to one, then the control system proceeds from step S56 to step S57, and resets the intake air quantity Qa (read at step S1 of FIG. 4, and used for calculation of the manifold inflow air mass quantity Ca) to zero. Moreover, at step S57, the control system sets intake stop flag fFQa to one, to indicate the judgment of the engine stop state due to the fulfillment of either of the above-mentioned conditions. Step S57 corresponds to a resetting section.

As a result, from the next execution cycle, the control system proceeds from step S41 to step S59 because of intake stop flag fFQa set to one, and examines, at step S59, whether engine speed Ne is equal to zero. If engine speed Ne remains equal to zero, then the control system proceeds to step S42 and thereby holds the intake air quantity Qa equal to zero as long as the judgment of the intake stop state continues to exist.

Figure 12:
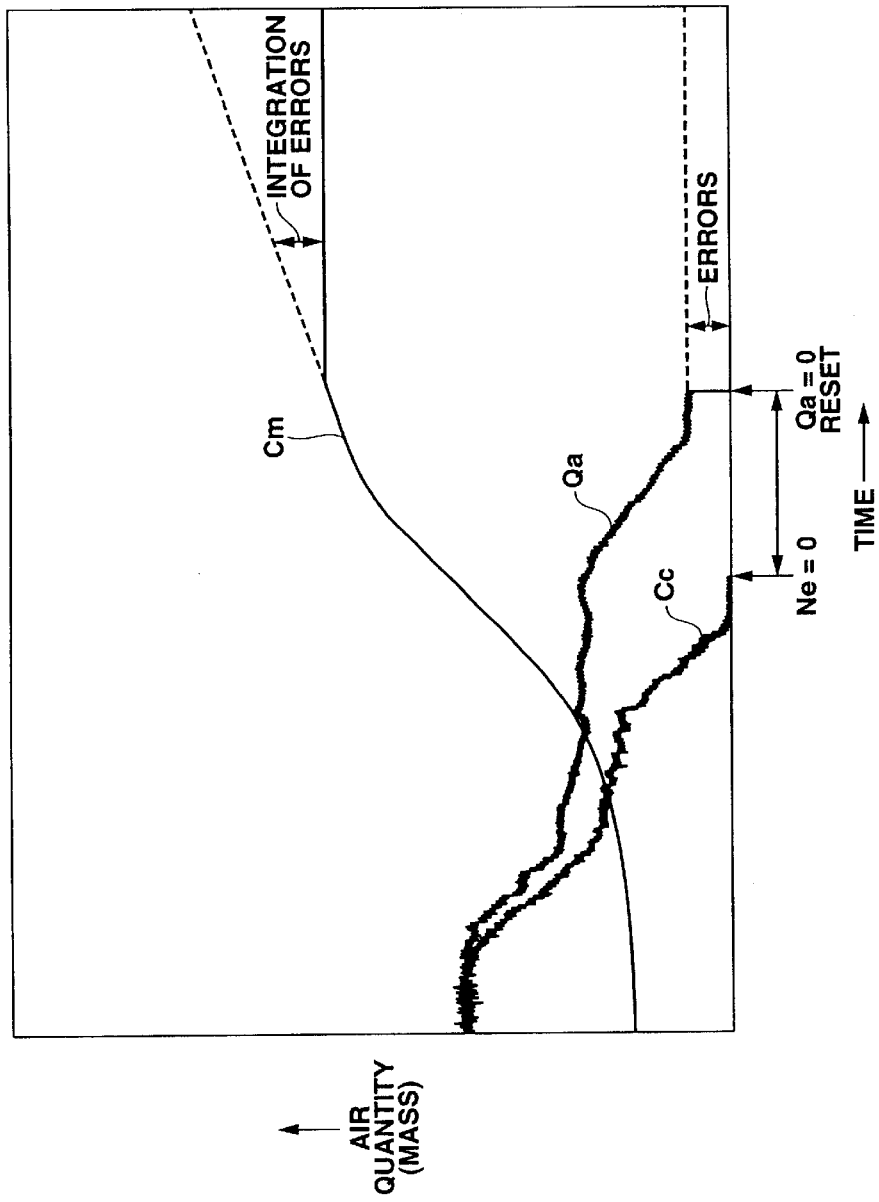
FIG. 12 is a graph showing operations of the engine control unit in the engine stop state.

By resetting the intake air quantity Qa to zero at the time of detection of the engine stop state, as shown by a solid line in FIG. 12, this control system can prevent the result of calculation of manifold air mass quantity Cm from deviating too much into an abnormal range, by continuous integration of nonuniformity errors in sensed values of air flowmeter 14, and thereby calculate the cylinder intake air quantity Cc correctly at a restart of the engine, by the balance calculation using a correct initial value of the manifold air quantity Cm. During a period from a time point of detection of Ne=0 shown in FIG. 12, to a time point of reset of Qa=0, the engine speed Ne remains equal to zero. During this period, however, a negative pressure remains in the manifold section, and air flows through a gap at throttle valve 9, so that air flowmeter 14 produces a positive output.

When first and second intake stop flags fFQaA and fFQaB are both equal to zero and the answer of step S56 is negative, indicating the nonexistence of the engine stop state, then the control system proceeds from step S56 to step S58, and sets the intake air quantity Qa used for calculation of manifold inflow air mass quantity Ca, equal to Qa sensed by air flowmeter 14. In this case, the intake air quantity Qa sensed by air flowmeter 14 is directly used for the calculation without any modification.

When engine speed Ne is not equal to zero, and the answer of step S59 is affirmative, then the control system proceeds to step S60, and resets to zero each of flags fFQa, fFTMA, fFTMB, fFQaA and fFQaB. After step S60, the control system proceeds to step S58 of FIG. 11, and performs a setting operation to use intake air quantity Qa sensed by air flowmeter 14 directly.

Figure 13:
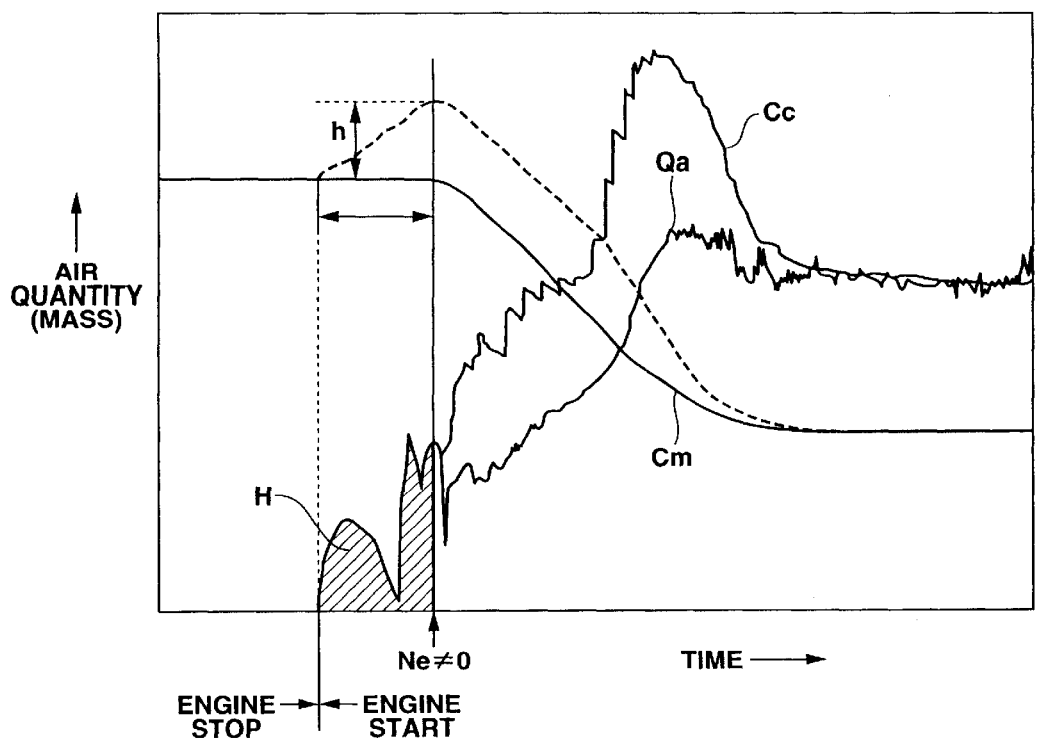
FIG. 13 is a graph showing operations of the engine control unit in an engine starting state.

During a period of delay in sensing engine speed Ne by crank angle sensor 12 in a starting operation of the engine, the intake air quantity Qa is immediately sensed by air flowmeter 14 whereas the cylinder intake air quantity Cc is held at zero. Consequently, if this sensed intake air quantity Qa is used, the manifold air quantity Cm increases one-sidedly, and errors are accumulated. In a very slow engine speed operation such as starting operation, in fact, the manifold inflow air quantity Ca and the manifold outflow air quantity Cc are approximately equal to each other, and the manifold air quantity Cm does not increase. Therefore, until detection of engine speed Ne by crank angle sensor 12 (for example, until two or more REF signals are produced and the determination of engine speed Ne from the period between successive REF signals becomes feasible), the intake air quantity Qa used for calculation of manifold inflow air quantity Ca is set to zero. The intake air quantity Qa sensed by air flowmeter 12 is used after a start of the engine speed sensing operation. By the thus-controlled intake air quantity Qa, the control system can prevent measurement errors from being accumulated in manifold air quantity Cm (so that a portion shown by a hatched area H in FIG. 13 is not added), and improve the sensing accuracy of cylinder intake air quantity Cc. In FIG. 13, a height h corresponds to the area of the hatched area H.

In the illustrated embodiment of the invention, the routine of FIG. 5 corresponds to means for calculating a cylinder intake air volume quantity in accordance with a cylinder volume at an intake valve closing timing. Step S21 of FIG. 6 corresponds to means for calculating a manifold air mass quantity by determining a balance between an intake manifold inflow air mass quantity and an intake manifold outflow air mass quantity. Step S22 corresponds to means for calculating a cylinder intake air mass quantity in accordance with the cylinder intake air volume quantity, the manifold air mass quantity and a manifold volume. Step S57 of FIG. 11 corresponds to means for resetting the manifold inflow air mass quantity Qa·∆t to zero when an engine stop state is detected.

This application is based on a prior Japanese Patent Application No. 2001-028823. The entire contents of the Japanese Patent Application No. 2001-028823 with a filing date of Feb. 5, 2001 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A cylinder intake air quantity calculating apparatus for an engine, the cylinder intake air quantity calculating apparatus comprising:
   a cylinder intake air volume quantity calculating section to calculate a cylinder intake air volume quantity in accordance with a cylinder volume at an intake valve closing timing, and an incylinder fresh air rate;
   a manifold air mass quantity calculating section to calculate a manifold air mass quantity by calculating a balance between an intake manifold inflow air mass quantity which is the mass of air flowing into an intake manifold section of the engine and which is determined from an air flow rate sensed on an upstream side of the intake manifold section, and an intake manifold outflow air mass quantity which is the mass of air flowing out of the intake manifold section into a cylinder section of the engine;
   a cylinder intake air mass quantity calculating section to calculate a cylinder intake air mass quantity in accordance with the cylinder intake air volume quantity, the manifold air mass quantity and a manifold volume; and
   a resetting section to reset the manifold inflow air mass quantity to a minimum setting value when an engine stop state having no intake air inducted into the engine is detected.

2. The cylinder intake air quantity calculating apparatus as claimed in claim 1, wherein the resetting section is configured to reset the manifold inflow air mass quantity to zero upon receipt of an engine stop detection signal, and the cylinder intake air quantity calculating apparatus further comprises an engine stop detecting section to produce the engine stop detection signal upon detection of the engine stop state which is an intake stop state in which no air is inducted into the engine.

3. The cylinder intake air quantity calculating apparatus as claimed in claim 2, wherein the engine stop detecting section is configured to produce the engine stop detection signal when the air flow rate sensed by an air flowmeter on the upstream side of the manifold section is within a predetermined flow rate range.

4. The cylinder intake air quantity calculating apparatus as claimed in claim 2, wherein the engine stop detecting section is configured to produce the engine stop detection signal when a variation of the air flow rate sensed by an air flowmeter on the upstream side of the manifold section is equal to or smaller than a predetermined value.

5. The cylinder intake air quantity calculating apparatus as claimed in claim 4, wherein the engine stop detecting section is configured to determine a smoothed value of the air flow rate sensed by the air flowmeter, and to use the smoothed value as the air flow rate sensed by the air flowmeter.

6. The cylinder intake air quantity calculating apparatus as claimed in claim 2, wherein the engine stop detecting section is configured to produce the engine stop detection signal when an engine speed sensed by an engine speed sensor is equal to zero.

7. The cylinder intake air quantity calculating apparatus as claimed in claim 2, wherein the engine stop detecting section is configured to produce the engine stop detection signal when any two or more of first, second and third conditions are satisfied, the first condition being satisfied when the air flow rate sensed by an air flowmeter on the upstream side of the manifold section is within a predetermined flow rate range, the second condition being satisfied when a variation of the air flow rate sensed by the air flowmeter is equal to or smaller than a predetermined value, the third condition being satisfied when an engine speed sensed by an engine speed sensor is equal to zero.

8. The cylinder intake air quantity calculating apparatus as claimed in claim 1, wherein the resetting section is configured to reset the manifold inflow air mass quantity to zero at the expiration of a predetermined time period after the engine stop state is detected.

9. The cylinder intake air quantity calculating apparatus as claimed in claim 1, wherein the resetting section is configured to reset the manifold inflow air mass quantity to zero at the expiration of a predetermined time period after one of an unexpected engine stop and an idle stop command is detected.

10. The cylinder intake air quantity calculating apparatus as claimed in claim 1, wherein the resetting section is configured to hold the manifold inflow air mass quantity equal to zero from a reset of the manifold inflow air mass quantity to zero until an engine speed sensed by an engine speed sensor becomes greater than a minimum setting value.

11. The cylinder intake air quantity calculating apparatus as claimed in claim 1, wherein the cylinder intake air quantity calculating apparatus comprises the engine which is equipped with a variable valve timing actuator to control an intake valve closing timing of the engine, and the cylinder intake air volume calculating section is configured to calculate the cylinder volume at the intake valve closing timing in accordance with the intake valve closing timing controlled by the variable valve timing actuator.

12. The cylinder intake air quantity calculating apparatus as claimed in claim 1, wherein the resetting section is configured to reset the manifold inflow air mass quantity to zero when the engine is restarted after an idle stop operation.

13. An engine system comprising:

an engine including an intake manifold section and a cylinder section into which intake air is inducted from the intake manifold section;

an engine speed sensor to sense an engine speed of the engine;

an air flowmeter to sense an intake air flow rate at a position on the upstream side of the intake manifold section; and a processing unit configured;

to calculated a cylinder intake air volume quantity in accordance with a cylinder volume at an intake valve closing timing, and an incylinder fresh air rate;

to calculate a manifold air mass quantity by calculating a balance between an intake manifold inflow air mass quantity which is the mass of air flowing into the intake manifold section of the engine and which is determined from the air flow rate sensed by the air flowmeter, and an intake manifold outflow air mass quantity which is the mass of air flowing out of the intake manifold section into the cylinder section of the engine;

to calculate a cylinder intake air mass quantity in accordance with the cylinder intake air volume quanitity, the manifold mass quantity and a manifold volume;

to examine whether the engine speed sensed by the engine speed sensor is within a stop range indicative of an engine stoppage;

to examine whether the air flow rate sensed by the air flowmeter is within a predetermined flow rate range; and to reset the manifold inflow air mass quantity to a minimum setting value when an engine stop rate exists, wherein the engine stop state is detected when no intake air inducted into the engine is detected or when the engine speed is within the stop range and at the same time the air flow rate sensed by the air flowmeter is within the flow rate range.

14. An engine system comprising:

an engine including an intake manifold section and a cylinder section into which intake air is inducted from the intake manifold section;

an engine speed sensor to sense an engine speed of the engine;

an air flowmeter to sense an intake air flow rate at a position on the upstream side of the intake manifold section; and a processing unit configured;

to calculate a cylinder intake air volume quantity in accordance with a cylinder volume at an intake valve closing timing, and an incylinder fresh air rate;

to calculate a manifold air mass quantity by calculating a balance between an intake manifold inflow air mass quantity which is the mass of air flowing into the intake manifold section of the engine and which is determined from the air flow rate sensed by the air flowmeter, and an intake manifold outflow air mass quantity which is the mass of air flowing out of the intake manifold section into the cylinder section of the engine;

to calculate a cylinder intake air mass quantity in accordance with the cylinder intake air volume quantity, the manifold air mass quantity and a manifold volume;

to examine whether the engine speed sensed by the engine speed sensor is within a stop rang indicative of an engine stoppage;

to examine whether a variation of the air flow rate sensed by the air flowmeter is equal to or a smaller than a predetermined value; and to reset the manifold inflow air mass quantity to a minimum setting value when an engine stop state exists, wherein the engine stop state is detected when no intake air inducted into the engine is detected or when the engine speed is within the stop range and at the same time the variation of the air flow rate sensed by the air flowmeter is equal to or smaller than the predetermined value.

* * * * *